(12) United States Patent
Miyata

(10) Patent No.: US 7,566,070 B2
(45) Date of Patent: Jul. 28, 2009

(54) AIRBAG SYSTEM AND MOTORCYCLE WITH AIRBAG SYSTEM

(75) Inventor: Yasuhito Miyata, Minato-ku (JP)

(73) Assignee: Takata Corporation, Tokyo (JP)

( * ) Notice: Subject to any disclaimer, the term of this patent is extended or adjusted under 35 U.S.C. 154(b) by 122 days.

(21) Appl. No.: 11/626,689

(22) Filed: Jan. 24, 2007

(65) Prior Publication Data

US 2007/0170702 A1   Jul. 26, 2007

(30) Foreign Application Priority Data

Jan. 25, 2006  (JP) .............................. 2006-016835

(51) Int. Cl.
  *B60R 21/16*  (2006.01)
  *B60R 21/20*  (2006.01)
  *B62J 27/20*  (2006.01)
(52) U.S. Cl. .............. 280/730.1; 280/728.1; 280/728.2; 280/730.2; 280/733; 280/735; 280/743.2; 180/219; 180/271
(58) Field of Classification Search ................. 180/271, 180/217; 280/728.1, 728.2, 730.1, 730.2, 280/735, 733, 743.2; 296/68.1
See application file for complete search history.

(56) References Cited

U.S. PATENT DOCUMENTS

| | | | |
|---|---|---|---|
| 5,873,598 A * | 2/1999 | Yoshioka et al. ............. 280/740 |
| 6,007,090 A | 12/1999 | Hosono et al. | |
| 7,021,657 B2 * | 4/2006 | Kassman et al. .......... 280/743.2 |
| 7,029,029 B2 * | 4/2006 | Yamazaki et al. ......... 280/730.1 |
| 7,134,684 B2 * | 11/2006 | Miyata ..................... 280/730.1 |
| 7,275,762 B2 * | 10/2007 | Miyata ..................... 280/743.2 |
| 7,331,600 B2 * | 2/2008 | Miyata ..................... 280/730.1 |
| 2002/0036401 A1 * | 3/2002 | Tokita et al. .............. 280/743.2 |
| 2003/0189323 A1 * | 10/2003 | Akiyama et al. ............ 280/729 |
| 2003/0214122 A1 | 11/2003 | Miyata | |
| 2004/0150197 A1 * | 8/2004 | Iijima et al. .............. 280/730.1 |
| 2004/0256848 A1 * | 12/2004 | Miyata et al. ............ 280/743.2 |

FOREIGN PATENT DOCUMENTS

| | | |
|---|---|---|
| JP | 2002-137777 | 5/2002 |
| JP | 2002-137779 | 5/2002 |
| JP | 2002-137780 | 5/2002 |
| JP | 2003-011871 | 1/2003 |

* cited by examiner

*Primary Examiner*—Paul N Dickson
*Assistant Examiner*—James English
(74) *Attorney, Agent, or Firm*—Fitch, Even, Tabin & Flannery

(57) ABSTRACT

A technique is provided effective in improving rider restraint performance of an airbag in an airbag system to be mounted to a motorcycle. In one form, an airbag system to be mounted to a motorcycle includes an airbag restricting device for restricting the deployment of the airbag toward the rider's head at the early stage of the deployment of the airbag in the event of a head-on collision of the vehicle.

17 Claims, 10 Drawing Sheets

AIRBAG SYSTEM AND MOTORCYCLE WITH AIRBAG SYSTEM

FIELD OF THE INVENTION

The present invention relates to a technique of constructing an airbag system to be mounted to a motorcycle.

BACKGROUND OF THE INVENTION

Various techniques for restraining the rider of a motorcycle with an airbag system mounted to the motorcycle are known. For example, known techniques include a technique of restraining the rider of a motorcycle in the event of a head-on collision by inflating an airbag housed in a case mounted to the body frame (refer to Japanese Unexamined Patent Application Publication No. 2002-137777). The technique presents the possibility of providing a wide restraint area of the airbag. However, for an airbag system to be mounted to a vehicle in which the periphery of the rider is open, such as a motorcycle, there is a great demand for improving the performance of restraining the rider by inflating the airbag in a desired state in the event of a head-on collision.

SUMMARY OF THE INVENTION

The present invention is made in view of this point. Accordingly, it is an object of the invention to provide a technique effective in improving the performance of restraining a rider by an airbag in an airbag system to be mounted to a motorcycle.

In order to attain the above object, the invention described herein is provided. The invention described herein is typically applicable to the construction of the airbag system to be mounted in various kinds of motorcycle. In this specification, "a motorcycle," a typical example of vehicles, includes various straddle-type vehicles that a rider straddles, such as touring motorcycles having a fuel tank in front of a rider seat and motor scooters having a space between a rider seat and a handlebar-supporting head pipe. In addition to the motorcycles, the "motorcycle" includes vehicles that riders straddle and that have three or more running wheels (e.g., three-wheel motorbikes for use in home delivery service and three- or four-wheel buggies for bad roads) and vehicles that riders ride on and that run by sleighs or caterpillars, such as snow mobiles.

A first form of the present invention for solving the problems is an airbag system to be mounted to a motorcycle, and includes at least an airbag, a gas supply device, and an airbag restricting device.

The airbag of the first form of the invention is an airbag for restraining a rider, which restrains a rider by deploying toward a rider restraint region in front of the rider in a head-on collision of the motorcycle.

The gas supply device of the first form of the invention supplies airbag-inflation gas to the airbag so as to deploy the airbag toward the rider restraint region in front of the rider in a head-on collision of the motorcycle. Typically, the gas supply device of the invention has the mechanism of generating airbag-inflation gas when sensing the head-on collision of the motorcycle and guiding the airbag-inflation gas into the airbag. The "head-on collision" here broadly includes collisions with a running or still object in front of the motorcycle, for example, another vehicle, a pedestrian, or an obstacle. The "rider restraint region" here is defined as a space extending in the direction of the forward movement of a rider, for restraining the rider who is flung ahead of the motorcycle by a kinetic energy during a head-on collision.

It is desirable for the airbag system of this type to be mounted to a motorcycle such that the airbag not only inflates to the rider restraint region in front of the rider but also inflates according to the situation. Specifically, when the airbag first inflates toward the head of the rider who leans forward at a head-on collision of the motorcycle, the load from the airbag applied in the direction opposite to the moving direction of the rider may be applied to the rider's head.

Accordingly, the airbag system of the invention includes an airbag restricting device. The airbag restricting device of the invention restricts the deployment of the airbag toward the rider's head in the early stage of the deployment of the airbag in the head-on collision of the motorcycle. The use of the airbag restricting device allows restriction of the deployment of the airbag toward the rider's head in the early stage of the deployment of the airbag in the head-on collision of the motorcycle. Thus the load applied on the rider's head from the airbag can be reduced in the early stage of the deployment of the airbag. The concrete arrangement of the airbag restricting device may be either an arrangement in which the airbag is folded so as to prevent the airbag from deploying toward the rider's head in the early stage of the deployment of the airbag or an arrangement in which a member for applying a tensile force to the part of the airbag which deploys toward the rider's head is attached to the outer surface or inner surface of the airbag.

The arrangement of the airbag system according to the first form of the invention allows an improvement of the rider restraint performance of the airbag in the early stage of the deployment of the airbag in the head-on collision of the motorcycle by using the airbag restricting device for restricting the deployment of the airbag toward the ride's head.

A second form of the present invention for solving the problems is an airbag system wherein the airbag restricting device described in the first form of the invention restricts the deployment of the airbag toward the rider's head to thereby first deploy a rider-side airbag part of the airbag which faces the rider toward the rider's chest to push the rider's chest toward the rear of the motorcycle by the rider-side airbag part, thereby raising the upper body of the rider, and then to deploy the rider-side airbag part which faces the rider toward the rider's head.

The arrangement of the airbag system according to the second form of the invention allows the rider restraint performance of the airbag to be improved while receiving the rider with the airbag by restraining the chest and then the head of the rider with the airbag.

A third form of the present invention for solving the problems is an airbag system wherein the airbag described in the first or second form of the invention is housed in an airbag housing portion in a specified folded state, and protrudes toward the rider restraint region through an airbag opening on the top of the airbag housing portion to thereby restrain the rider's head by the rider's head restraint portion deploying toward the rider's head. Typically, the airbag is rolled up like a roll or pleated like an accordion. In this airbag system, the airbag restricting device according to the first or second form is disposed inside the outer shape of the airbag housing portion and on the plane of the airbag opening and attached to the rider's head restraint region, with the airbag housed in the airbag housing portion, so as to restrict the deployment of the airbag toward the rider's head in the early stage of the deployment of the airbag.

The arrangement of the airbag system according to the third form of the invention allows the use of the airbag restricting device attached to the rider's head restraint portion of the airbag to restrict the deployment of the airbag toward the rider's head in the early stage of the deployment of the airbag in the head-on collision of the motorcycle.

A fourth form of the present invention for solving the problems is a motorcycle with an airbag system. This motorcycle with an airbag system is equipped with an airbag system in which an airbag deploys into a rider restraint region in front of the rider to restrain the rider when supplied with airbag-inflation gas in a head-on collision of the motorcycle, wherein the airbag system is according to any one of the first, second, or third forms of the invention.

The invention according to the fourth form therefore provides a motorcycle equipped with an airbag system having an airbag with improved rider restraint performance.

As described above, in an airbag system in which an airbag deploys into a rider restraint region in front of the rider to restrain the rider when supplied with airbag-inflation gas in a head-on collision of the motorcycle, the present invention allows the rider restraint performance of the airbag to be improved by using an airbag restricting device for restricting the deployment of the airbag toward the rider's head in the early stage of the deployment of the airbag in the head-on collision of the motorcycle.

DETAILED DESCRIPTION OF THE PREFERRED EMBODIMENTS

Figure 1:
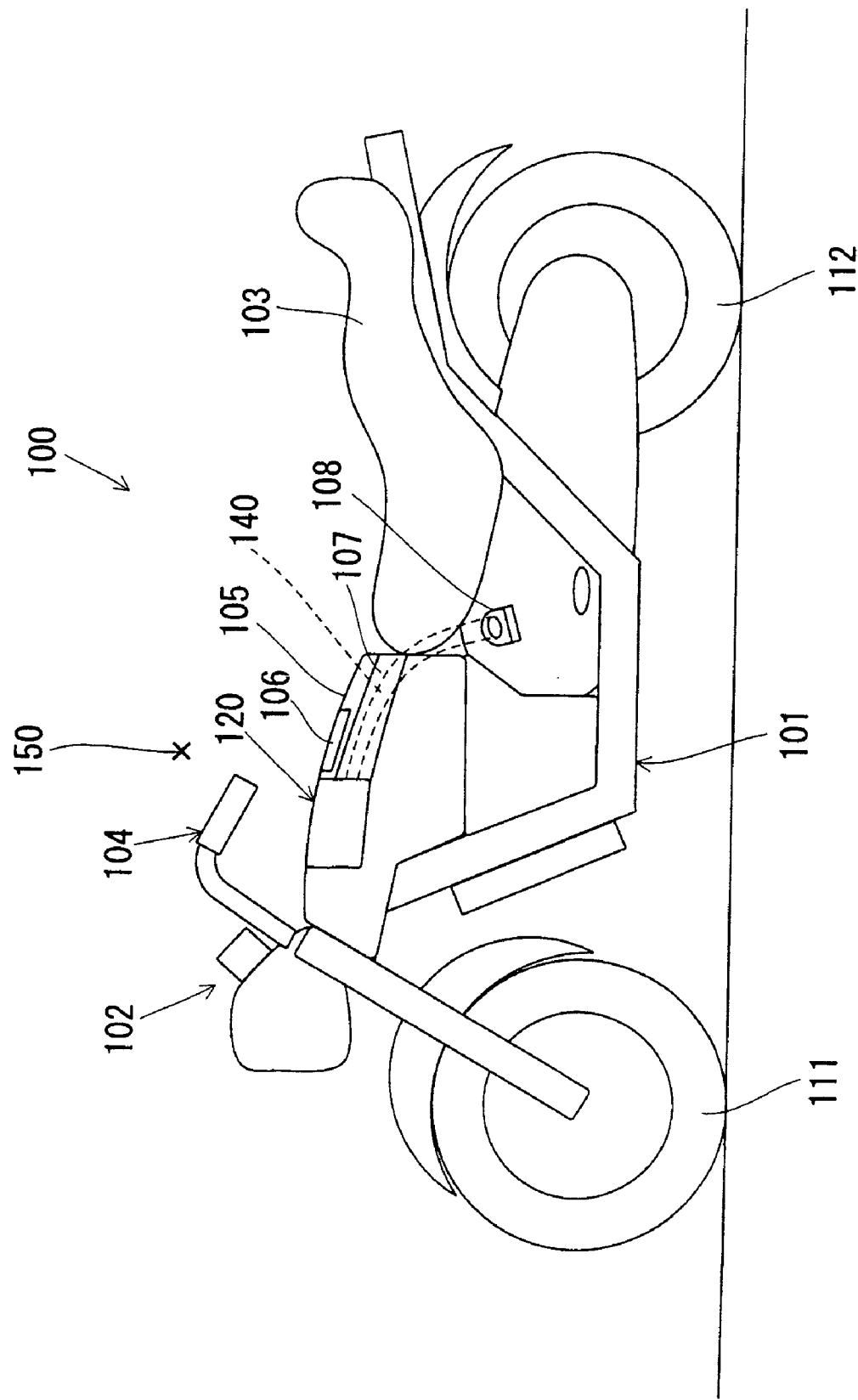
FIG. 1 is a side view of a motorcycle 100 according to an embodiment of the invention, in which an airbag system 120 is mounted to the motorcycle 100.
Figure 2:
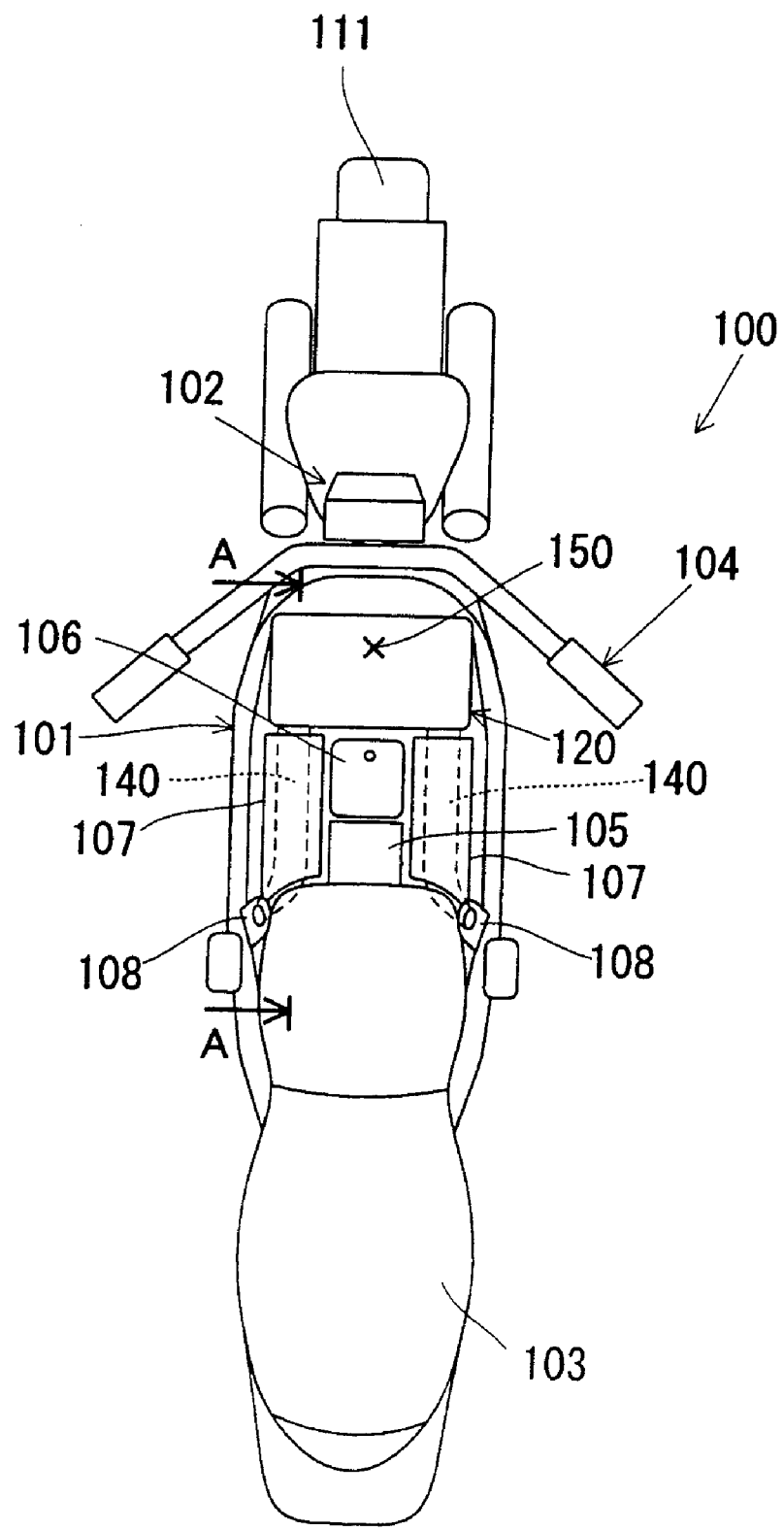
FIG. 2 is a top view of the motorcycle 100 in FIG. 1.

The present invention will be further illustrated with examples below. Referring first to FIGS. 1 and 2, the entire structure of a motorcycle 100 will be described. FIG. 1 is a side view of the motorcycle 100 according to an embodiment of the invention, to which an airbag system 120 is mounted. FIG. 2 is a top view of the motorcycle 100 in FIG. 1. The motorcycle 100 of the embodiment corresponds to the "motorcycle with an airbag system or the "motorcycle" of the invention.

As shown in FIGS. 1 and 2, the motorcycle 100 is a so-called touring motorcycle mainly composed of a body frame 101 including an engine and a main frame; a seat 103 that a rider can straddle; a handlebar 104; a front wheel 111; and a rear wheel 112.

The region above the body frame 101 of the motorcycle 100 and in front of the rider seated in the seat 103 is specified as a rider restraint region 150 in the event of a head-on collision of the motorcycle 100. The "head-on collision" in the embodiment broadly includes that the motorcycle 100 collides with a front object (not shown for convenience sake, for example, motorcycles, various vehicles other than motorcycles, pedestrians, obstacles, or guardrails). The "rider restraint region 150" of this embodiment corresponds to the "rider restraint region" of the invention, which is defined as a space extending in the direction of the forward movement of the rider seated in the seat 103 by a kinetic energy during a head-on collision, for restraining the rider who is flung ahead of the motorcycle 100.

A front part 102 of the body frame 101 at the front of the vehicle has a headlight, various meters, switches, a windshield and so on. A fuel tank 106 is disposed in front of a vehicle component 105 in the region between the front part 102 and the seat 103. An airbag system (also referred to as an airbag module) 120 is disposed ahead of the fuel tank 106. The fuel tank 106 is provided with webbing covers 107 on both sides thereof, for covering a pair of right and left webbings 140 which is a component of the airbag system 120. In a normal state in which the airbag system 120 is not operating, the webbings 140 extend in the housing space between the webbing covers 107 and the vehicle component 105, so that they cannot be seen or hardly seen from the exterior by the covering of the webbing covers 107. The details of the webbings 140 will be described later in the description of the structure of the airbag system 120.

Figure 3:
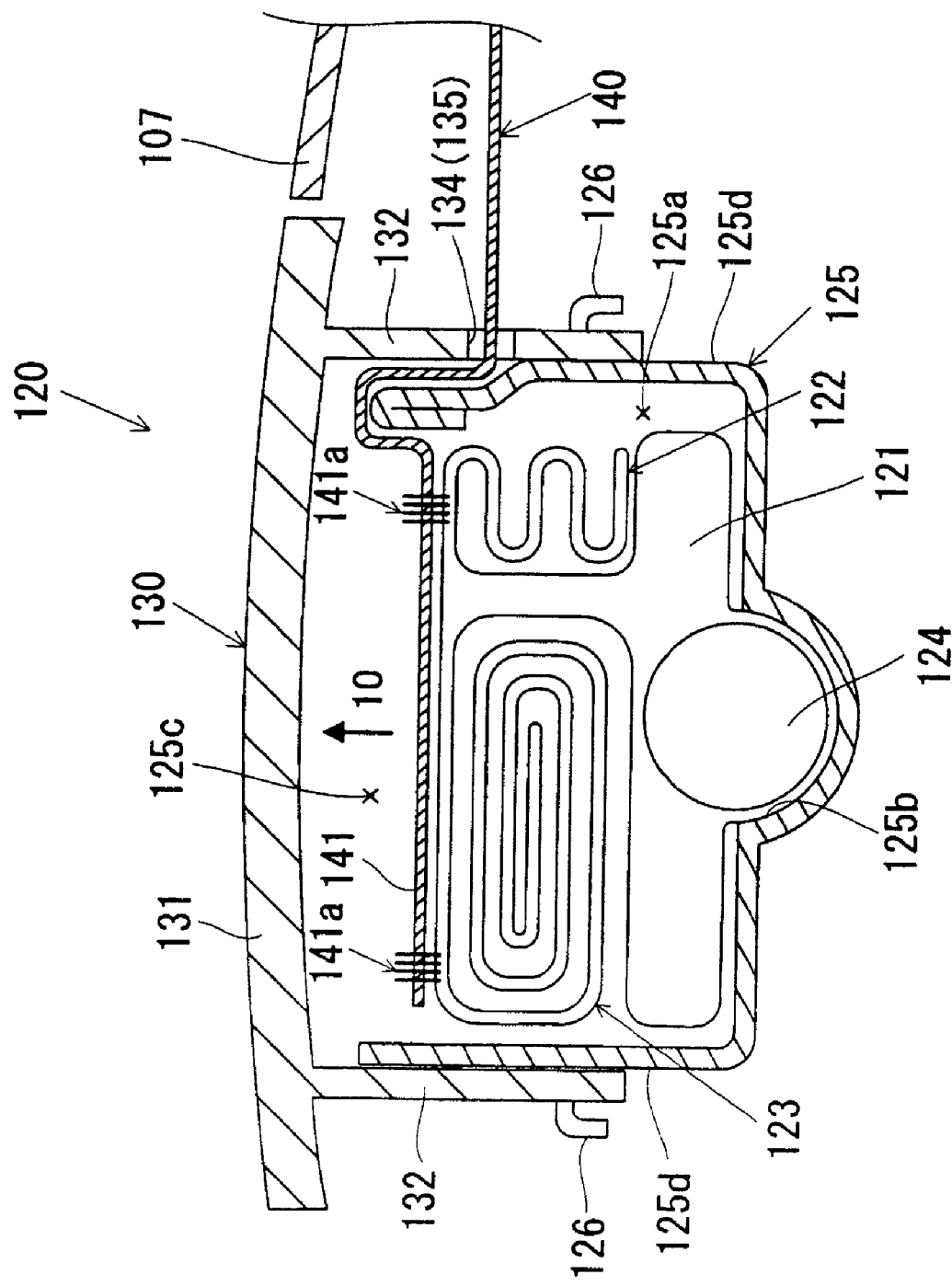
FIG. 3 is a cross sectional view of the motorcycle 100 taken along line A-A of FIG. 2.
Figure 4:
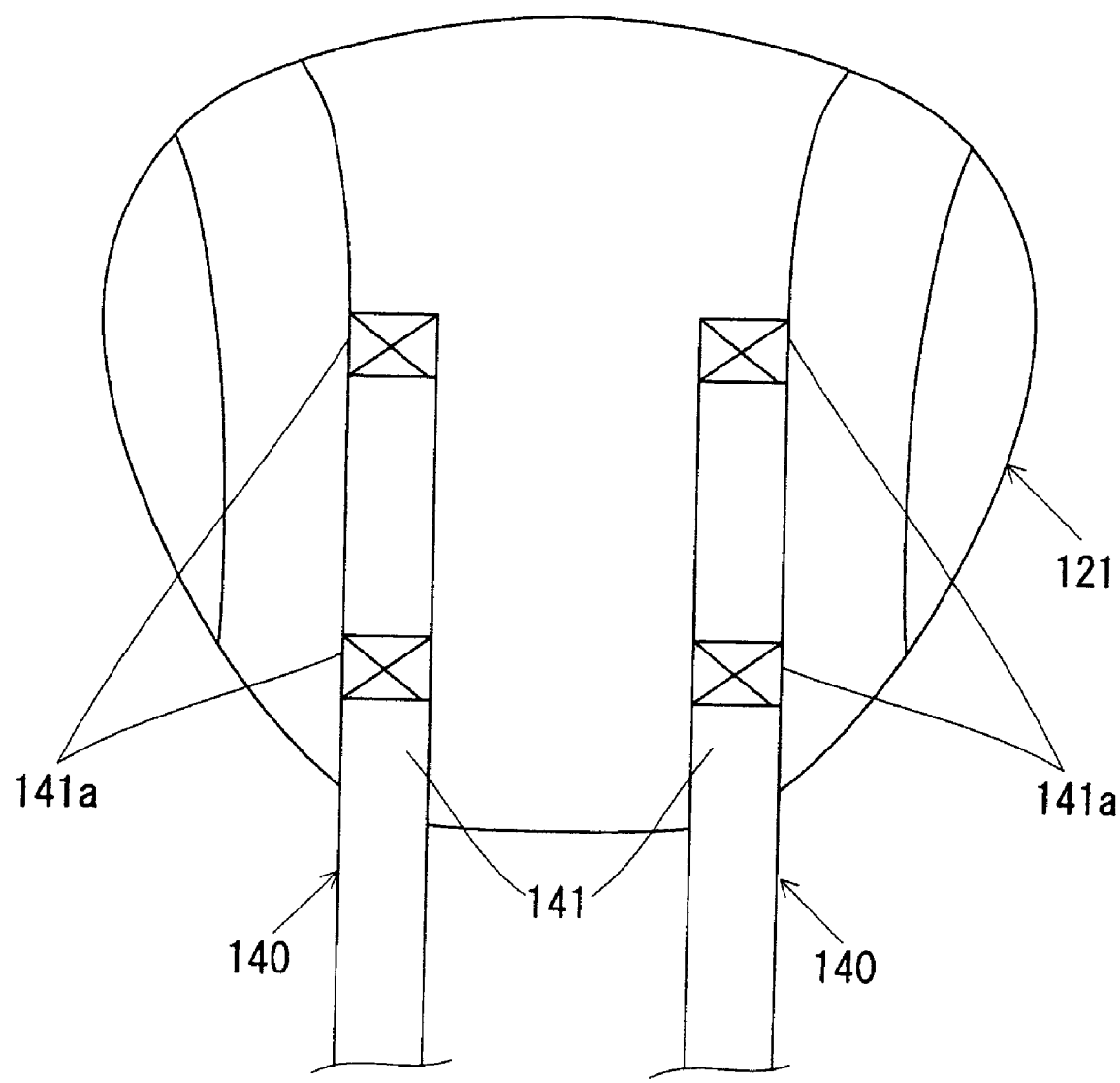
FIG. 4 is a plan view of an airbag 121 before it is housed in a retainer 125 in the airbag system 120 of FIG. 2.

Referring to FIGS. 3 and 4, the structure of the airbag system 120 of this embodiment will be specifically described. FIG. 3 shows the cross section of the motorcycle 100 taken along line A-A of FIG. 2. FIG. 4 is a plan view of an airbag 121 in the airbag system 120 of FIG. 2 before it is housed in a retainer 125. The airbag system 120 is disposed so as to face the rider restraint region (the rider restraint region 150 in FIG. 1) for the rider seated in the seat 103. The airbag system 120 corresponds to the "airbag system" of the invention.

Referring to FIG. 3, the airbag system 120 of the embodiment is mainly composed of the airbag 121, an inflator 124, the retainer 125, a module cover 130, and the webbings 140. In FIG. 3, the right is the rear of the vehicle, and the left is the front of the vehicle.

As shown in FIG. 4, the airbag 121 has stitched portions 141a to which a first end 141 of each webbing 140 is sewn. In this embodiment, the stitched portions 141a are provided at a rider's head restraint portion (a rider's head restraint portion 122a, to be described later), so that the webbings 140 are attached to the rider's head restraint portion. The airbag 121 is made of the same material as that of car airbags into the shape of a bag, and is housed in the retainer 125 in a predetermined folded state such that the stitched portions 141a with the webbings 140 are disposed upward.

Specifically, the airbag 121 is housed in the retainer 125 in a folded state in which, a rider-side airbag part 122 of the airbag which protrudes toward the rider (or toward the rear of the vehicle) during inflation is accordion-pleated such that the pleats are piled in the vertical direction, and a front airbag part 123 which protrudes toward the front of the vehicle during inflation is rolled up toward the front of the vehicle (refer to FIG. 3). The accordion pleats of the rider-side airbag part 122 are defined as pleats in which the rider-side airbag part 122 is accordion-pleated. The roll of the front airbag part 123 is defined as a roll in which the front airbag part 123 is rolled up. The rider-side airbag part 122 is disposed at the rear of the housing space of the retainer 125, and the front airbag part 123 is disposed at the front of the housing space. Referring to FIG. 3, the direction of the protrusion (deployment) of the airbag 121 in a collision is indicated by arrow 10. The airbag 121 corresponds to the "airbag" of the invention.

Each webbing 140 is a long tether, the first end 141 of which is stitched to the airbag 121, and a second end is connected to a fastener (a fastener 108 in FIGS. 1 and 2) of the body. The webbings 140 extend in parallel at two portions in the front-back direction between the airbag system 120 and the body of the motorcycle 100 to connect the airbag 121 to the body. This ensures the stability of the deployment motion of the airbag 121, and the stability of the inflated airbag 121 in restraining the rider with the webbings 140. Particularly, the use of the pair of right and left webbings 140 allow the rider-restraining stability to be improved by balancing the deployment of the right and left of the airbag 121. The webbings 140 are made of the same webbing material as that of car seatbelts (shaped like a belt-like member made of resin fibers) or the same material as that of an airbag fabric into the shape of a belt. The webbings 140 may be shaped like a strap in place of the belt. The webbing 140 to be attached to the airbag 121 may be one or more as appropriate.

An inflator 124 is configured as a device for generating airbag-inflation gas at a vehicle collision so that the airbag 121 in a folded state is inflated while deploying from the retainer 125 and for supplying the gas into the airbag 121. The inflator 124 may be configured such that either it is housed in the bag-shaped airbag 121 and supplies the generated airbag-inflation gas directly into the airbag 121, or it is connected to the airbag 121 through a gas supply passage and indirectly supplies the generated airbag-inflation gas into the airbag 121 through the gas supply passage. The inflator 124 corresponds to the gas supply device of the invention.

The retainer 125 is a bottomed-box casing for housing the airbag 121 in the folded state and the inflator 124. Specifically, the retainer 125 has at least an airbag housing portion 125a for housing the airbag 121 and an inflator housing portion (recessed portion) 125b for housing the inflator 124. An airbag opening 125c at the top of the retainer 125 allows the deployment of the airbag 121. With the airbag 121 in a housed state, the webbings 140 are disposed inside the outer shape of the retainer 125 and on the top of the airbag opening 125c. The retainer 125 corresponds to the "airbag housing portion" of the invention, and the airbag opening 125c of the retainer 125 corresponds to the "airbag opening" of the invention.

The module cover 130 covers the airbag 121 in a housed state by covering the airbag opening 125c of the retainer 125 from above, and has at least a top plate 131 and a depending portion 132. The module cover 130 is typically made of a resin material by die molding. The top plate 131 of the module cover 130 is a plate extending substantially horizontally along the plane of the airbag opening 125c of the retainer 125 to define the upper surface of the airbag system 120. The depending portion 132 of the module cover 130 is a plate-like member extending from the lower surface (back surface) of the top plate 131 in the vertical direction crossing the extension of the top plate 131 along the wall 125d of the retainer 125 (mounted portion). The part of the depending portion 132 adjacent to the rear of the vehicle (adjacent to the rider) has a pair of left and right webbing through holes 134 that communicate the interior and the exterior of the module cover 130 with each other. This allows the webbings 140 to extend from the interior to the exterior of the module cover 130. The depending portion 132 is fixed to the retainer wall 125d with fasteners 126, so that the module cover 130 and the retainer 125 are joined to each other. The webbing through holes 134 are provided at a thin portion (fragile portion) of the depending portion 132, that is, a tear line 135.

Figure 5:
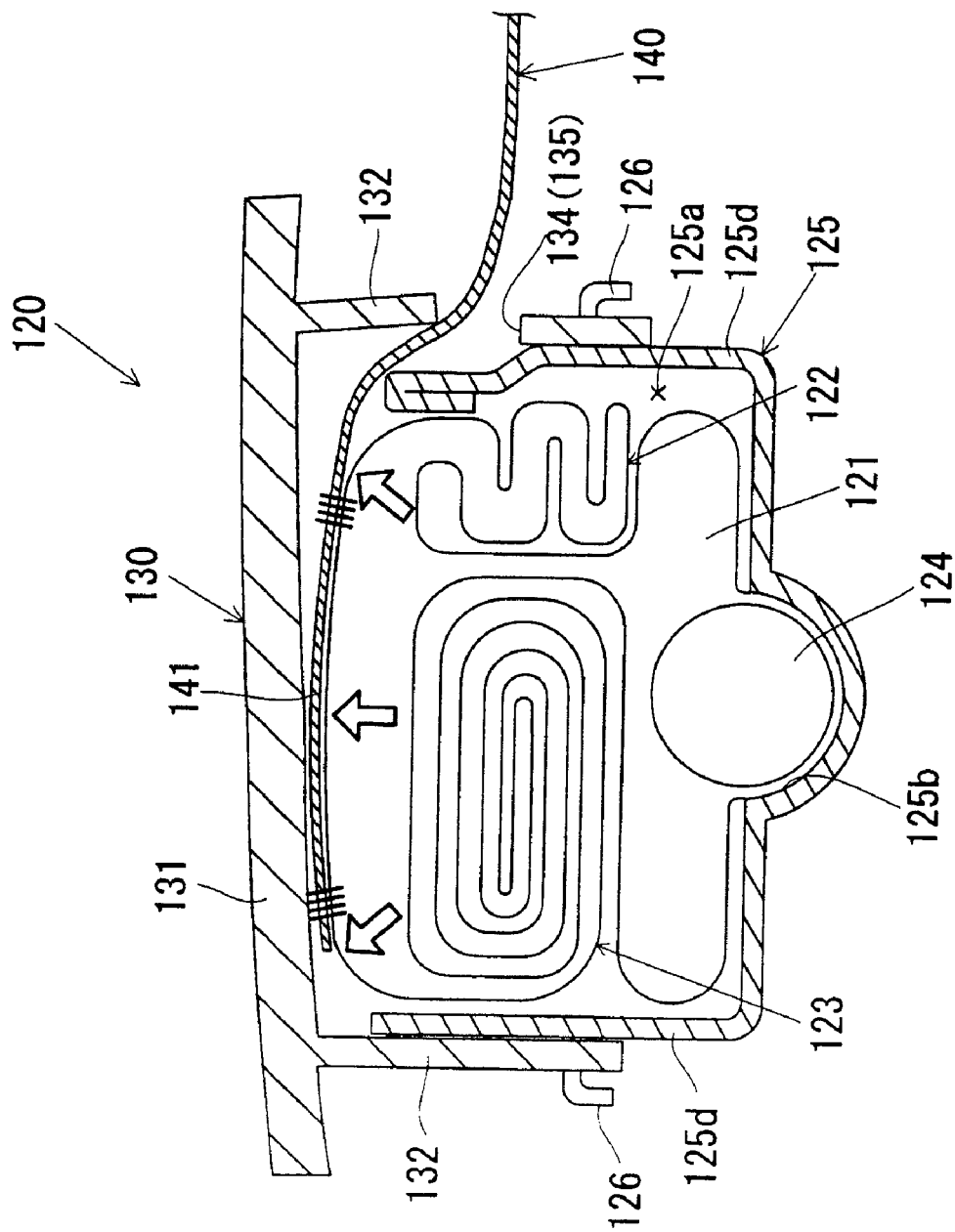
FIG. 5 is a diagram of the airbag 121 in an early stage of the deployment in the airbag system 120 of the embodiment.
Figure 6:
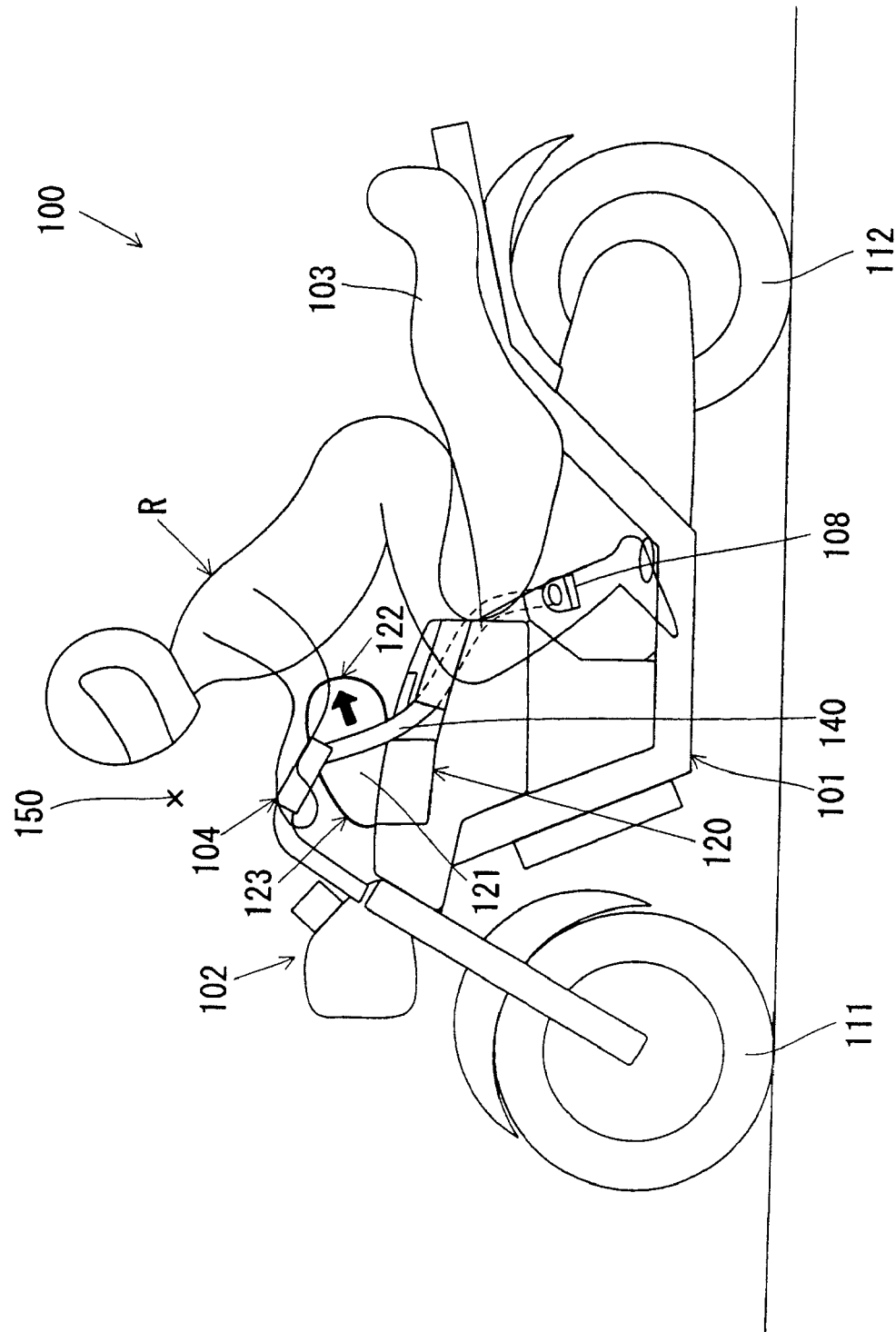
FIG. 6 is a diagram of the airbag 121 in an early stage of the deployment in the airbag system 120 of the embodiment.
Figure 7:
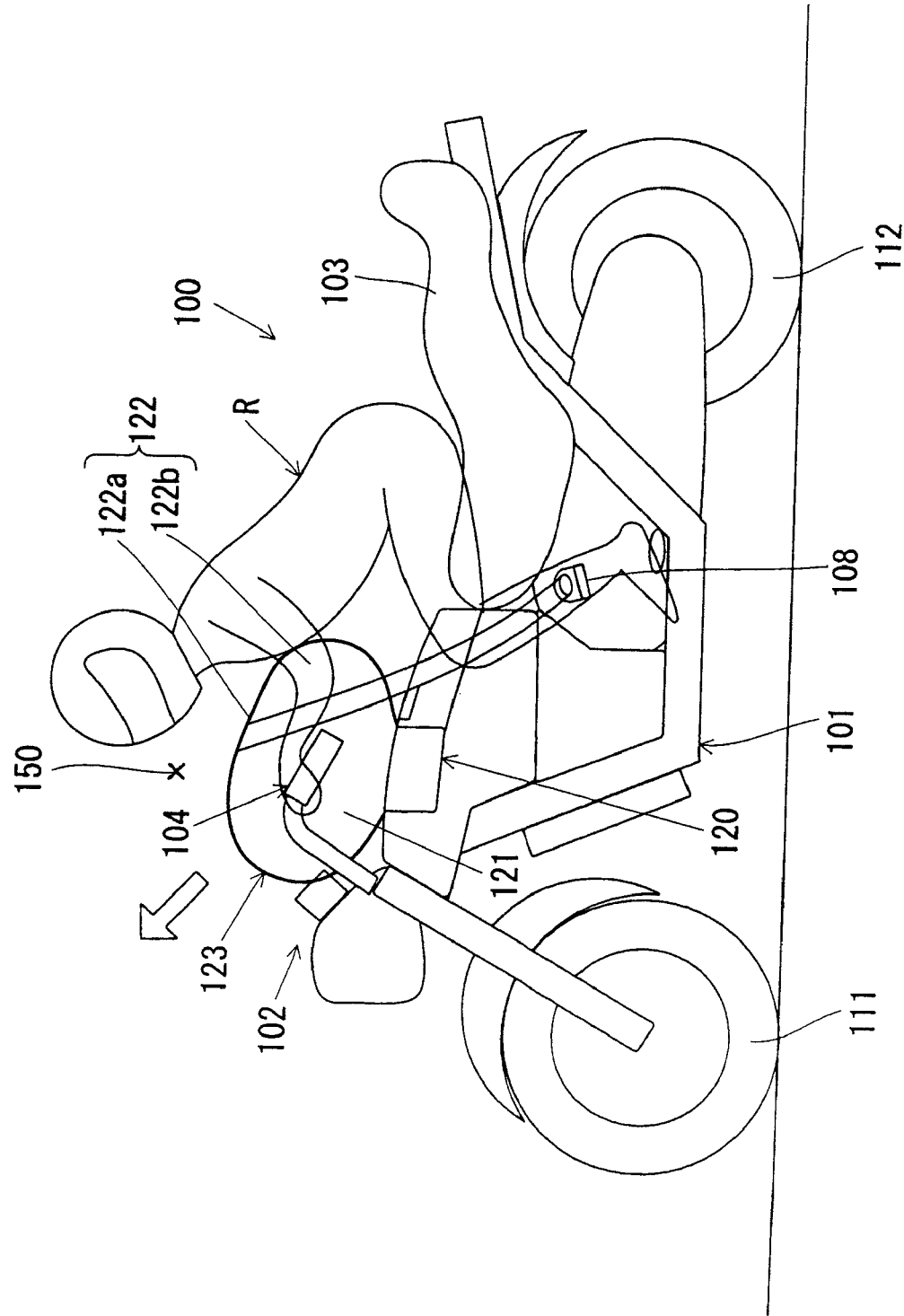
FIG. 7 is a side view of the motorcycle 100 when the airbag 121 of the embodiment is in the middle of deployment.
Figure 8:
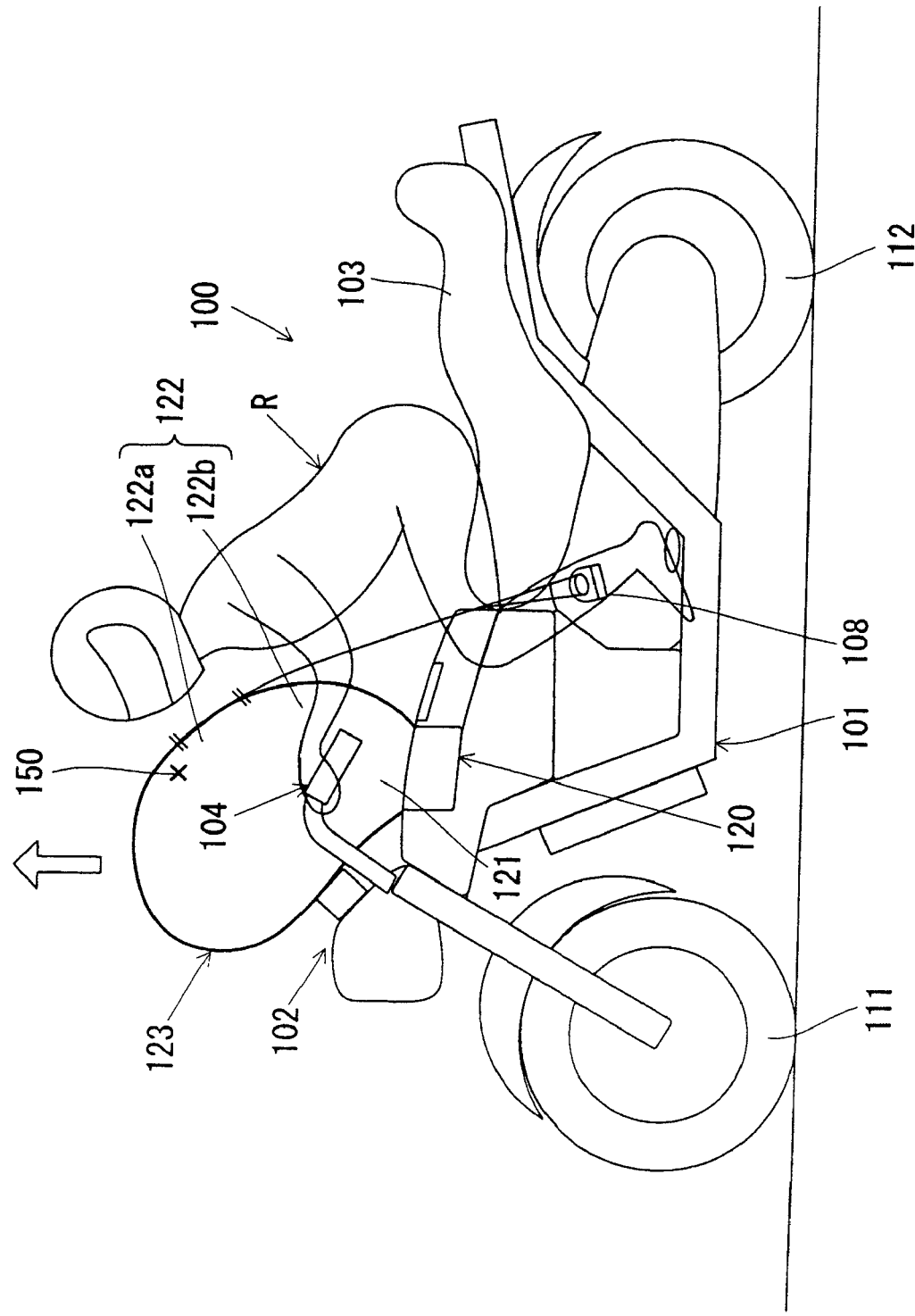
FIG. 8 is a side view of the motorcycle 100 when the airbag 121 of the embodiment is in the middle of deployment.
Figure 9:
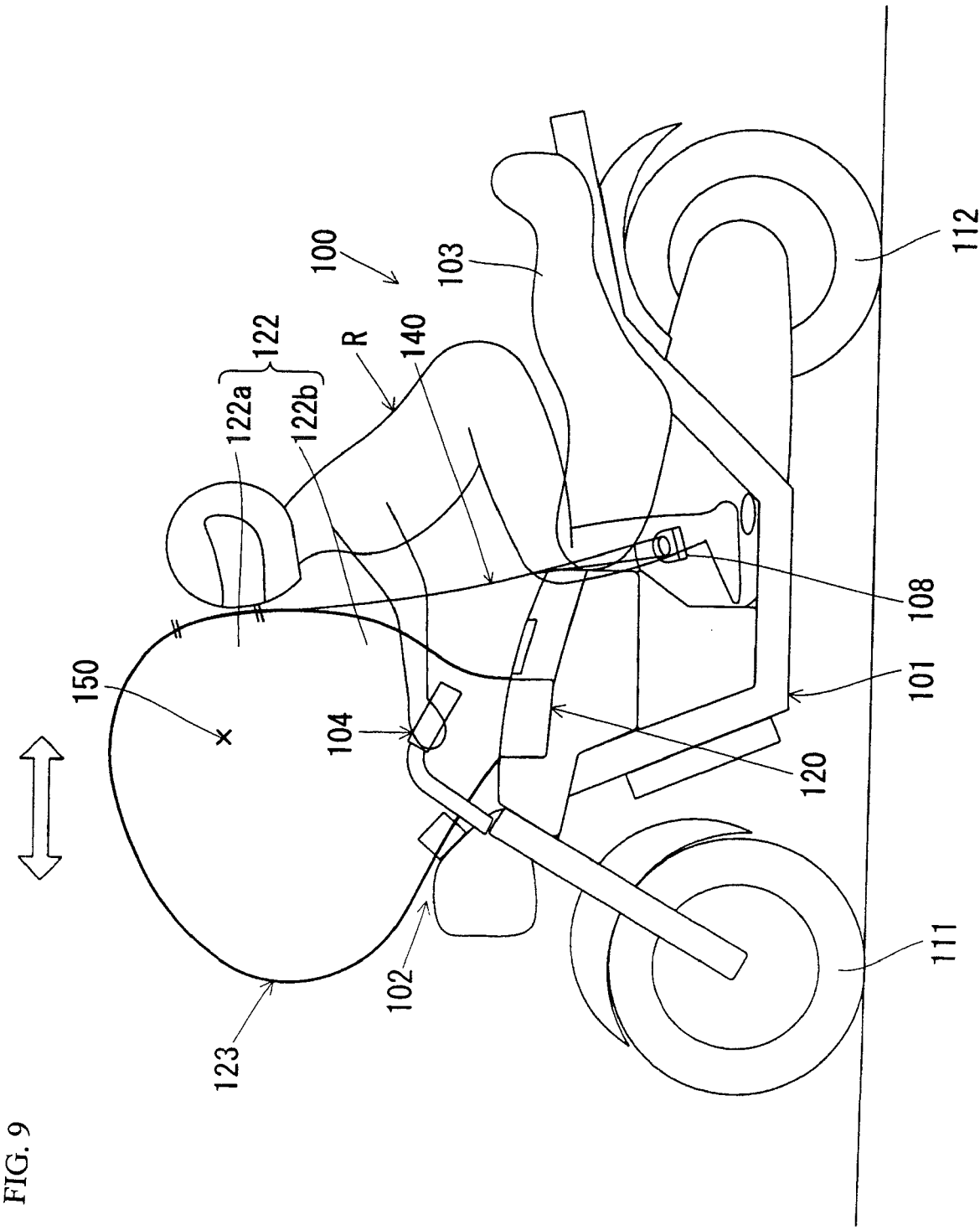
FIG. 9 is a side view of the motorcycle 100 when the airbag 121 of the embodiment is in the middle of deployment.
Figure 10:
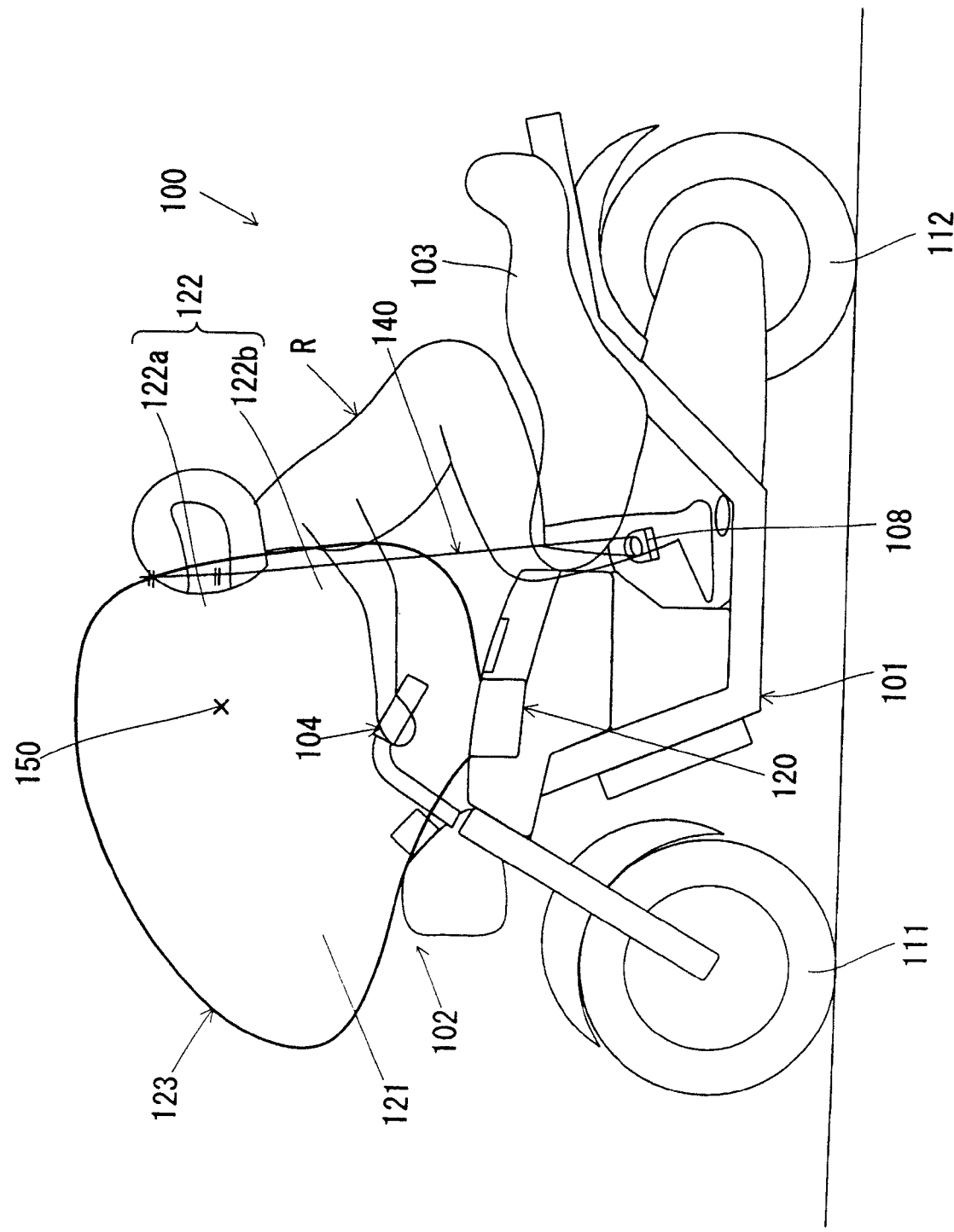
FIG. 10 is a side view of the motorcycle 100 when the airbag 121 of the embodiment has fully deployed.

The operation of the airbag system 120 with this arrangement will be described with reference to FIGS. 5 to 10. FIGS. 5 and 6 show the airbag 121 in an early stage of the deployment of the airbag 121 of the airbag system 120 of the embodiment; FIGS. 7 to 9 show the motorcycle 100 in the middle of the deployment of the airbag 121, as viewed from the side; and FIG. 10 shows the airbag 121 after completion of the deployment, as viewed from the side.

When the motorcycle 100 comes into a collision in the traveling direction, the rider is moving (being flung) ahead of the motorcycle 100. In the embodiment, upon detection of the head-on collision, the inflator 124 of the airbag system 120 is activated to start to supply the inflation gas generated by the inflator 124 into the airbag 121. Thus, the airbag 121 starts to protrude (deploy) in the direction of arrow 10 in the airbag system 120 of FIG. 3 in an inoperative state. Since the inflation gas is continuously supplied into the airbag 121, the airbag 121 sequentially forms an inflated section from the inflator 124.

Referring to FIG. 5, directly after the activation of the airbag system 120, the airbag 121 pushes the top plate 131 of the module cover 130 from below by the deploying force. When receiving the deploying force from the airbag 121, the top plate 131 is torn open along the tear line 135 to deploy to the front of the vehicle with the front of the depending portion 132 as a hinge to release the cover of the airbag opening 125c of the retainer 125. This allows the deployment of the airbag 121, so that the airbag 121 protrudes out of the retainer 125 through the airbag opening 125c of the retainer 125. Upon the deployment of the airbag 121, a tensile load is started to be applied to the webbings 140 stitched to the airbag 121 through the first ends 141. Thus, the webbings 140 push open the webbing covers 107 upward to release the covering by the webbing covers 107.

As the airbag 121 of this embodiment is housed in the retainer 125 in a folded state in which the rider-side airbag part 122 is accordion-pleated such that the pleats are piled in the vertical direction, and the front airbag part 123 is rolled up toward the front of the vehicle. The fold release resistance of the pleated rider-side airbag part 122 is lower than that of the rolled front airbag part 123. The "release resistance" here is for releasing the fold, which is necessary to recover from a specified folded state to the state before the fold and substantially has a correlation with the recovery time until it recovers the state before the fold. That is, the recovery time necessary for releasing the fold becomes relatively long when the release resistance is relatively high whereas the recovery time necessary for releasing the fold becomes relatively short when the release resistance is relatively low.

Accordingly, as shown in FIG. 6, the airbag 121 inflates earlier in the rider-side airbag part 122 than the other airbag parts including the front airbag part 123 at the early stage of the inflation in the event of the head-on collision of the motorcycle. Thus, the rider R is quickly restrained by the inflated rider-side airbag part 122. With this arrangement in which the rider-side airbag part 122 deploys earlier than the other airbag parts (hereinafter, referred to as "a first arrangement"), the remaining airbag parts (the front airbag part 123) can be inflated with stability by the support of the first inflated rider-side airbag part 122. This provides the advantages of ensuring the stability of deploying action of the airbag 121. Since this advantage is given also by the webbings 140 (hereinafter, referred to as "a second arrangement"), it is preferable to have both the first arrangement and the second arrangement in order to improve the stability of the deploying action of the airbag 121. However, the second arrangement (the webbings 140) can be omitted provided that stability of a desired level can be ensured only by the first arrangement.

For the airbag system 120 of this type to be mounted to a motorcycle, it is desirable that the airbag 121 (the rider-side airbag part 122) not only inflate to the rider restraint region 150 ahead of the rider R but also inflate according to the situation. Specifically, when the airbag 121 first inflates toward the head of the rider who leans forward in a head-on collision of the motorcycle, the load from the airbag 121 applied in the direction opposite to the moving direction of the rider may be applied to the rider's head.

Therefore, this embodiment proposes a technique for further improving rider restraint performance not only by inflating the airbag 121 to the rider restraint region 150 but also by taking the order of deployment to the rider's head or the rider's chest into consideration. Specifically, the embodiment is constructed such that when the airbag 121 shown in FIG. 6 further inflates, the webbings 140 disposed on the airbag 121 and attached to the rider's head restraint portion 122a restrict the deploying action of the airbag 121, thereby controlling the deploying action. The webbings 140 here correspond to the airbag restricting device of the invention.

With this arrangement, as shown in FIG. 7, the deployment of the rider's head restraint portion 122a of the rider-side airbag part 122 toward the rider's head is restricted by the webbings 140, so that a rider's chest restraint portion 122b first deploys toward the rider's chest and then the rider's head restraint portion 122a deploys toward the rider's head. The "rider's head restraint portion 122a" here is a region for mainly restraining the head or the face of the rider R, while the "rider's chest restraint portion 122b" is a region for mainly restraining the chest of the rider R. With the rider's chest restraint portion 122b first deploying toward the rider's chest, the rider's chest restraint portion 122b softly receives the chest of the rider R in a forward leaning posture and pushes it toward the rear of the vehicle, thereby raising the upper body of the rider R. In this state, the deployment of the rider's head restraint portion 122a toward the rider's head is restricted by the webbings 140, allowing decreasing the load applied to the head of the rider R from the rider's head restraint portion 122a in the direction opposite to the movement of the rider R.

Then, in the airbag 121 shown in FIG. 7, the front airbag part 123 protrudes to the front of the vehicle (for example, along the empty arrow in FIG. 7) by the action of restricting the rider's head restraint portion 122a by the webbings 140, and then protrudes upward (for example, along the empty arrow shown in FIG. 8) through the deployment shown in FIG. 8. The front airbag part 123 protruding upward comes into the front of the head of the rider R, as shown in FIG. 9. Thus, this embodiment is configured such that the rider's chest restraint portion 122b first deploys toward the rider's chest, and then the rider's head restraint portion 122a deploys toward the rider's head, thus allowing the rider restraint performance by the airbag 121 to be improved while softly receiving the rider R with the airbag 121. This embodiment in which the front airbag part 123 is rolled toward the front of the vehicle is advantageous in smoothly achieving a series of deploying action of the front airbag part 123 shown in FIGS. 7 to 9, that is, the action of deploying to the front of the vehicle and then deploying upward.

Furthermore, the whole of the airbag 121 protrudes in the front-back direction (for example, along the empty arrow in FIG. 9) into a fully inflated state in which the airbag 121 has completely deployed, as shown in FIG. 10. In this fully inflated state, the inflated airbag 121 fills the rider restraint region 150 in front of the rider R, so that the rider R who is moving forward by the kinetic energy in a collision is restrained by the inflated airbag 121.

In this fully inflated state, the webbings 140 extend fully substantially in a straight line between the airbag 121 and the fastener 108, thereby restricting the upward and forward action of the airbag 121 by the tension of the webbings 140. The fully inflated airbag 121 comes into contact with the front part 102 at the front and with the handlebar 104 at both ends. This arrangement can stabilize the restraint of the rider R with the fully inflated airbag 121.

Thus, according to the embodiment, the airbag 121 is folded in such a manner that the rider-side airbag part 122 is folded so as to deploy earlier than the other airbag parts including the front airbag part 123 (the rider-side airbag part 122 is accordion-pleated and the front airbag part 123 is rolled up). Therefore, the inflated rider-side airbag part 122 of the airbag 121 can quickly restrain the rider R. Particularly, since the rider-side airbag part 122 whose release resistance is set relatively low is disposed at the rear of the housing space of the retainer 125, the rider-side airbag part 122 can be quickly inflated toward the rider R in the early stage of the inflation of the airbag 121. Moreover, since the way of folding the airbag 121 is devised so that the fold release resistance of the rider-side airbag 122 is low, the rider restraint performance of the airbag 121 can be improved by a simple structure.

The combination of the folded state of the rider-side airbag part 122 and that of the front airbag part 123 may be changed as appropriate provided that the fold release resistance of the rider-side airbag part 122 is set lower than that of the front airbag part 123. In addition to the arrangement of this embodiment in which the rider-side airbag part 122 is accordion-pleated and the front airbag part 123 is rolled up, the invention may adopt, for example, a first arrangement in which both the rider-side airbag part 122 and the front airbag part 123 are accordion-pleated, and the number of folds of the rider-side airbag part 122 is set smaller than that of the front airbag part 123 and a second arrangement in which both the rider-side airbag part 122 and the front airbag part 123 are rolled up and the number of folds (the number of windings) of the rider-side airbag part 122 is set smaller than that of the front airbag part 123.

According to this embodiment, the webbings 140 attached to the rider's head restraint portion 122a restrict the deployment of the airbag 121 toward the rider's head, so that, the rider's chest restraint portion 122b of the parts of the airbag 121 is first inflated toward the rider's chest, and then the rider's head restraint portion 122a is inflated toward the rider's head. This arrangement allows a decrease in the load applied to the head of the rider R from the rider's head restraint portion 122a. This embodiment particularly provides a strategic arrangement in which the webbings 140 for connecting the airbag 121 to the motorcycle are used as a device for restricting the deployment of the airbag 121 toward the rider's head. The invention may adopt not only the arrangement in which the webbings 140 are used as the device for first inflating the rider's chest restraint portion 122b of the airbag 121 toward the rider's chest but also an arrangement in which the way of folding the airbag 121 is devised or an arrangement in which a member for applying a tensile force to the airbag 121 is attached to the outer surface or inner surface of the airbag 121.

It is to be understood that the invention is not limited to the foregoing embodiment but various applications and modifications may be made. For example, the following embodiments to which the foregoing embodiment is applied may be made.

Although the embodiment has been described for the touring motorcycle 100, the invention may also be applied to other types of motorcycle such as a motor scooter that has a space for lateral movement of the rider's legs between the handlebar and the seat, or motorcycles other than the motorcycle 100.

Although the embodiment has been described for the case in which the airbag system 120 is disposed in front of the fuel tank 106, the position of the airbag system 120 can be varied as appropriate provided that the airbag 121 can deploy in a desired region. The airbag system 120 may be disposed behind or lower than the position shown in FIG. 1.

What is claimed is:

1. An airbag apparatus for a motorcycle, the airbag apparatus comprising:
    a retainer having forward and rearward sides with the rearward side closer to a rider of the motorcycle than the forward side;
    an airbag that is in a compact, folded configuration in the retainer and which is to be deployed and inflated out from the retainer for protecting the motorcycle rider during emergency conditions;
    a forward compact body of the folded airbag in the retainer adjacent the forward side thereof and having a first predetermined folded configuration and a first fold release resistance thereof;
    a rearward compact body of the folded airbag in the retainer adjacent the rearward side thereof and having a second predetermined folded configuration and a second fold release resistance that is lower than the first fold release resistance so that the folded airbag has a predetermined deployment sequence out from the retainer;
    a rearward initial stage of the predetermined deployment sequence wherein the rearward compact body initially deploys out from the retainer beyond the rearward side thereof to form an inflated lower, rider-side portion of the airbag; and
    a forward subsequent stage of the predetermined deployment sequence wherein the forward compact body subsequently deploys out from the retainer beyond the forward side thereof generally opposite to and after the deployment of the rearward compact body therefrom to form an inflated lower, forwardly extending portion of the airbag subsequent to the formation of the inflated lower, rider-side portion thereof.

2. The airbag apparatus of claim 1 including a tether having one end portion secured to an upper head-restraint portion of the inflated airbag and another end portion secured to the motorcycle, the one end portion including a first portion being secured adjacent the forward compact folded body and a second portion being secured adjacent the rearward compact folded body.

3. The airbag apparatus of claim 1 wherein the rearward compact folded body is at least partially accordion-folded in the second predetermined configuration and the forward compact folded body is at least partially roll-folded in the first predetermined configuration.

4. The airbag apparatus of claim 2 wherein the tether comprises a pair of tethers secured to opposing sides of the motorcycle.

5. A motorcycle comprising:
    a motorcycle body extending in a fore-and-aft direction and including a seat for a rider;
    an airbag for being deployed and inflated upon detection of a collision of the motorcycle;
    an inflator for supplying inflation gas to the airbag;
    a retainer having an internal space for housing the airbag in a folded state therein and being mounted to the motorcycle body forwardly of the seat with the inflator being disposed centrally in the fore-and-aft direction in the retainer internal space;
    a first compact body of the folded airbag disposed in a forward portion of the retainer internal space and being folded in a first predetermined configuration to have a first fold release resistance; and
    a second compact body of the folded airbag disposed directly adjacent to and rearwardly from the first compact body in the fore-and-aft direction in a rearward portion of the retainer internal space to be vertically level with the first compact body in the retainer and being folded in a second predetermined configuration to have a second fold release resistance lower than the first fold release resistance so that actuation of the centrally disposed inflator generally supplies inflation gas equally between the forwardly disposed first compact body and the adjacent rearwardly disposed second compact body with the different fold release resistances thereof causing the rearwardly disposed second compact body to deploy out from the retainer prior to the adjacent forwardly disposed first compact body.

6. The motorcycle of claim 5 including a tether having one end portion secured to the airbag and another end portion secured to the motorcycle body, with a first portion of the one end portion secured adjacent the first compact folded body and a second portion of the one end portion secured adjacent the second compact folded body.

7. The motorcycle of claim 5 wherein the second compact folded body is at least partially accordion-folded in the second predetermined fold configuration and the first compact folded body is at least partially roll-folded in the first predetermined fold configuration.

8. The motorcycle of claim 5 wherein the second compact folded body is positioned in the retainer adjacent to the rider and the first compact folded body positioned in the retainer away from the rider.

9. The motorcycle of claim 6 wherein the tether comprises a pair of tethers secured to opposing sides of the motorcycle.

10. The motorcycle of claim 6 wherein the retainer has upstanding walls and an upper opening defined by the upstanding walls, with the tether secured on a surface portion of the airbag adjacent the retainer upper opening.

11. The motorcycle of claim 10 wherein the retainer includes a cover portion covering the upper opening and the surface portion of the airbag to which the tether is secured extends generally parallel to the cover when the airbag is in the folded state in the retainer.

12. The motorcycle of claim 11 wherein the retainer cover has peripheral side wall portions depending therefrom and a tear line in one of the side wall portions such that a deployment force from the airbag surface portion to which the tether is secured will rupture the side wall portion at the tear line.

13. The motorcycle of claim 12 including an aperture in one of the peripheral side wall portions sized for the tether to extend therethrough.

14. An airbag system for a motorcycle, the airbag system comprising:
    an airbag for being deployed during emergency conditions to protect a rider of the motorcycle;
    a lower chest restraint portion of the airbag;
    an upper head restraint portion of the airbag; and
    a tether having opposite end portions with one end portion connected to the upper head restraint portion and the other end portion anchored to the motorcycle so that the tether restricts deployment of the upper head restraint portion to delay inflation thereof until after inflation of the lower chest restraint portion.

15. The airbag system of claim 14 wherein the airbag has a rear rider-side airbag portion including the lower chest restraint portion and the upper head restraint portion for being inflated and expanded rearwardly toward the motorcycle rider, and a front airbag portion being inflated and expanded forwardly away from the motorcycle rider, and different predetermined folded configurations of the rear rider-side airbag portion and the front airbag portion prior to deployment thereof with the rear rider-side airbag portion deploying prior to the front airbag portion and the different predetermined folded configurations being the sole cause for the deployment of the rear rider-side airbag portion prior to deployment of the front airbag portion.

16. The airbag system of claim 14 wherein the airbag upper head restraint portion includes a surface facing rearwardly toward the motorcycle rider upon inflation of the upper head restraint portion, and the one end portion of the tether is attached to the rearwardly facing surface of the airbag upper head restraint portion.

17. The airbag system of claim 14 including a retainer in which the airbag is folded, wherein the retainer has an upper opening through which the airbag is deployed and the one end portion of the tether extends across the retainer upper opening to be connected to the upper head restraint portion of the airbag within the retainer.

* * * * *